United States Patent [19]

Mitani et al.

[11] E Re. 31,119

[45] Reissued Jan. 4, 1983

[54] FLY-BACK TRANSFORMER WITH A LOW RINGING RATIO

[75] Inventors: Yutaka Mitani, Nagaokakyo; Katumi Tokuda, Nanao; Saburo Kitao, Kyoto, all of Japan

[73] Assignee: Murata Mfg., Co. Ltd., Nagaokakyo, Japan

[21] Appl. No.: 312,525

[22] Filed: Oct. 19, 1981

Related U.S. Patent Documents

Reissue of:

[64] Patent No.: 4,229,786
Issued: Oct. 21, 1980
Appl. No.: 943,678
Filed: Sep. 19, 1978

[30] Foreign Application Priority Data

| | | | |
|---|---|---|---|
| Sep. 26, 1977 | [JP] | Japan | 52-115850 |
| Oct. 18, 1977 | [JP] | Japan | 52-125625 |
| Nov. 30, 1977 | [JP] | Japan | 52-144716 |
| Dec. 13, 1977 | [JP] | Japan | 52-150317 |
| Dec. 21, 1977 | [JP] | Japan | 52-154707 |

[51] Int. Cl.[3] ..... H01J 29/70

[52] U.S. Cl. ..... 363/126; 315/411; 363/68

[58] Field of Search ..... 315/409–411; 336/136, 170, 185, 198, 208; 363/20, 68, 125, 126

[56] References Cited

U.S. PATENT DOCUMENTS

| | | | |
|---|---|---|---|
| 2,911,632 | 11/1959 | Levine et al. | 336/136 X |
| 3,017,589 | 1/1962 | Chass | 336/136 |
| 3,138,772 | 6/1964 | Persons | 336/136 |
| 3,235,790 | 2/1966 | Collins | 336/136 |
| 3,280,363 | 10/1966 | Powell | 336/170 X |
| 3,813,574 | 5/1974 | Sato | 315/411 |
| 3,866,086 | 2/1975 | Miyoshi et al. | 315/411 |
| 3,904,928 | 9/1975 | Sawada et al. | 336/94 X |
| 3,947,749 | 3/1976 | Kimura et al. | 363/126 |
| 4,079,295 | 3/1978 | Hollander | 315/411 |

*Primary Examiner*—William H. Beha, Jr.
*Attorney, Agent, or Firm*—Ostrolenk, Faber, Gerb & Soffen

[57] ABSTRACT

In a fly-back transformer, the tertiary winding for obtaining the secondary B power source is wound in a position where the coupling with the primary winding is weak and where it interlinks the leakage flux of the secondary winding with the primary winding, and the output of the tertiary winding is rectified during the scanning period of a horizontal deflection circuit of a television receiver. Accordingly, only the wave crest value of the ringing is made smaller, regardless of the shot pulse to be obtained within the secondary winding.

23 Claims, 30 Drawing Figures

FLY-BACK TRANSFORMER WITH A LOW RINGING RATIO

Matter enclosed in heavy brackets [ ] appears in the original patent but forms no part of this reissue specification; matter printed in italics indicates the additions made by reissue.

BACKGROUND OF THE INVENTION

The present invention relates to a fly-back transformer which is used for supplying a DC high-voltage for example, to a cathode ray tube of a TV receiver or the like, and relates more particularly to a fly-back transformer which is improved in having a small ringing ratio.

Generally, the fly-back transformer includes a primary winding as an input winding, a secondary winding as a high-voltage output winding, and a tertiary winding for drawing out signals such as AFC, AGC, etc., and a secondary B power source. The windings are wound for magnetic coupling therebetween, said primary winding and tertiary winding being particularly closely coupled with each other. In the fly-back transformer having the above construction, it is desirable to make the ringing ratio small for efficient operation. As shown in FIG. 1 illustrating a high voltage pulse induced at the secondary side of a fly-back transformer, when for example, a fifth tuning is taken, the ringing ratio Rr is the ratio of the first wave crest value B of the ringing, and the sum A of a shot pulse wave crest value and the ringing wave crest value B, expressed as a percentage: $Rr=(B/A)\times 100(\%)$. In conventional fly-back transformers, the resonance circuit of the leakage inductance and the stray capacity of the secondary winding is properly tuned to make the ringing ratio smaller. In such transformers, however, since the ringing and shot pulses change in association with each other, it is extremely difficult to make adjustments. Furthermore, since the wave crest value of the shot pulse is made smaller at the same time, even if the wave crest value of the ringing is made to become smaller than a certain value, improvement of the ringing ratio is undesirably limited.

SUMMARY OF THE INVENTION

Accordingly, an essential object of the present invention is to provide an improved fly-back transformer for use in supplying DC high voltage to a cathode ray tube of a TV receiver or the like which is capable of readily adjusting its ringing ratio, with the value of the ringing ratio being made smaller than that in conventional fly-back transformers.

Another important object of the present invention is to provide an improved fly-back transformer of the above described type in which only the wave crest value of the ringing is made small, irrespective of shot pulses.

A further object of the present invention is to provide an improved fly-back transformer of the above-described type in which the shot pulse waveform induced in its secondary winding is free from distortion even when a large load is applied to the tertiary winding.

A still further object of the present invention is to provide an improved fly-back transformer of the above-described type which is stable in function and simple in structure and can be manufactured at low cost.

In accomplishing these and other objects, according to one preferred embodiment of the present invention, there is provided a fly-back transformer for use in a horizontal deflection circuit of a television receiver comprising a core member, a first coil bobbin provided on said core member, a primary winding for low voltage supply [mountd] *mounted* on said first coil bobbin, a second coil bobbin provided on said first coil bobbin, a secondary winding for high voltage draw mounted on said second coil bobbin, a tertiary winding to serve as a secondary B power source, to provide an output signal, and the like. The tertiary coil is mounted at a position where its magnetic coupling to the primary winding is small in comparison with that to the secondary winding, and the leakage flux of the secondary winding with respect to the primary winding is made to interlink with the tertiary winding. A commutating circuit is connected with said tertiary winding to commutate the output of the tertiary winding during the scanning period of the horizonal deflection circuit.

In another embodiment of the present invention, two parts of the tertiary winding of a fly-back transformer are separately mounted in two positions. One position is such that the magnetic coupling with respect to the primary winding is strong, and the other position is such that the magnetic coupling with respect to the primary winding is weak. The tertiary winding interlinks with the leakage flux of the secondary winding with respect to the primary winding, the tertiary winding being operated to commutate during the scanning period of the deflection circuit.

The essential concept of the present invention is also applied to a fly-back transformer of the so-called multi-singular type in which the secondary winding is divided into a plurality of portions alternately connected in series to a plurality of diodes.

BRIEF DESCRIPTION OF THE DRAWINGS

These and other objects and features of the present invention will become apparent from the following description taken in conjunction with the accompanying drawings, in which.

DETAILED DESCRIPTION OF THE INVENTION

Figure 1:
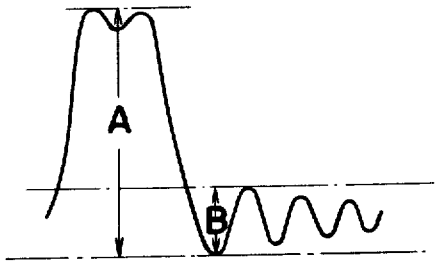
FIG. 1 shows an induction pulse waveform of the secondary winding, illustrating the ringing ratio of the fly-back transformer as mentioned above.
Figure 2:
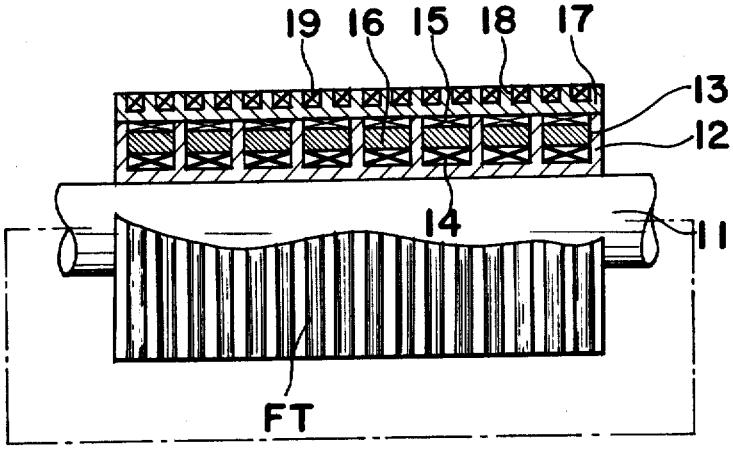
FIG. 2 is a cross-sectional view showing the essential parts of the fly-back transformer, in one embodiment of the present invention.
Figure 3:
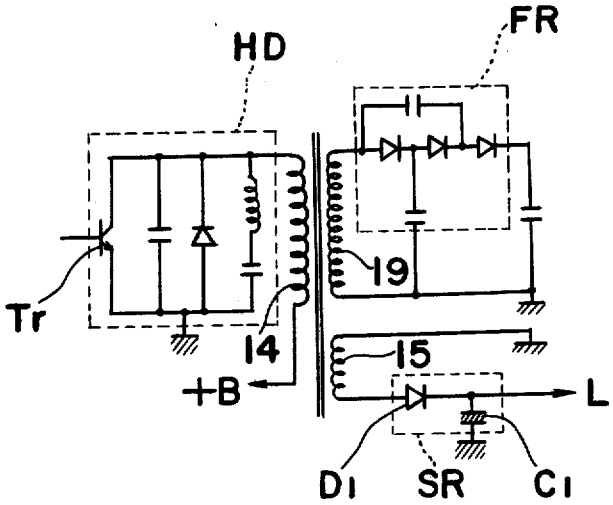
FIG. 3 is a mounting circuit diagram illustrating the operational effect of the fly-back transformer of FIG. 2.

Referring now to the drawings, wherein like numerals indicate like elements, there is shown in FIG. 2 a main portion of a fly-back transformer according to one preferred embodiment of the present invention. In the arrangement of FIG. 2, the fly-back transformer FT generally includes a ferrite core 11 of closed type, a low-voltage coil bobbin 12 made of an insulating material having a plurality of circular channels or grooves 13 formed on the outer surface thereof and fitted over the core 11, a primary winding 14 of coil type split-wound into each of the channels 13 of the low-voltage coil bobbin 12 in a line-out winding arrangement, a tertiary or third winding 15 of coil type also split-wound in a line out winding arrangement into each of the channels 13 over the primary winding 14 over a thick insulating material 16 such as a plastic film sheet or the like, to provide loose coupling with the primary winding, a high-voltage coil bobbin 17 made of an insulating material having a plurality of circular channels or grooves 18 formed on the outer surface thereof and fitted over the low-voltage coil bobbin 12; a secondary winding 19 of coil type split-wound into each of the channels 18 of the high-voltage coil bobbin 17 in a line-out winding arrangement; and a set of associated electric circuits including a horizontal deflection circuit HD, a first rectifier circuit FR and a second rectifier circuit SR each connected to the primary, secondary and tertiary windings 14, 19 and 15, as shown in the circuit diagram of FIG. 3.

Figure 4:
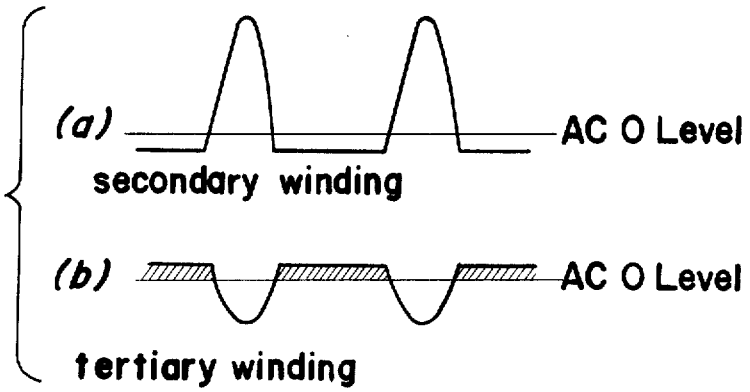
FIG. 4 illustrates the scanning period rectification, (a) showing an induction waveform of a secondary winding, (b) showing an induction waveform of a tertiary winding.

The primary winding 14 has a coil winding intermediate in length between the tertiary 15 and the secondary 19 windings, to be connected at one end to the horizontal deflection circuit HD of a television receiver and at the other end to a primary B power source +B in a known manner. The secondary winding 19 has the longest coil winding, connected at one end to the first rectifier circuit FR and at the other end to ground in known manner. The tertiary winding 15 has the shortest coil winding, connected at one end to a load L drawing an output signal through the second rectifier circuit SR and connected at the other end to ground, and is mounted at a position such that the magnetic coupling of the tertiary winding 15 to the primary winding 14 is small compared to that of the secondary winding 19. Additionally the leakage flux of the secondary winding 19 in relation to the primary winding 14 is made to interlink with the tertiary winding 15 to be operated by the second rectifier circuit SR to commutate during the scanning period of the horizontal deflection circuit HD. The tertiary winding 15 is split-wound over the thick insulating material 16 on the primary winding 14 to provide loose coupling with the primary winding 14, and may be wound in the direction opposite to that of the secondary winding 19 to allow the rectification to be performed only during the scanning period of the horizontal deflection circuit HD. The tertiary winding 15 is used to allow a so-called scanning period rectification to be performed during the scanning period when the tertiary winding 15 is connected through the second rectifier circuit SR to the load L, that is, in the oblique line period of the pulse waveform of FIG. 4(b) which is disposed above an AC zero level and induced in the tertiary winding 15 through the inversion of the pulse waveform of the tertiary winding 15 into the pulse waveform of the secondary winding 19 shown in FIG. 4(a). The pulse waveforms induced in the secondary and tertiary windings 19 and 15 are schematically shown respectively within the graphs of FIGS. 4(a) and (b), the abscissa representing time and the ordinate representing AC level.

However, it goes without saying that it makes no substantial difference which way the tertiary winding 15 is wound.

As this is a circuit for performing the scanning period rectification, several combinations of the winding direction of the tertiary winding 15 and the connecting direction of the rectification elements of the second rectifier circuit SR connected thereto can be used. In short, the second rectifier circuit SR is required to be constructed so that rectification elements such as diodes, etc., constituting it are not conductive during a fly-back period, but are conductive only during the scanning period. The secondary winding 19 is formed covering the primary winding 14 and the tertiary winding 15 and is positioned adjacent to the tertiary winding 15.

The fly-back transformer of the present invention is fundamentally constructed as described above and characterized in that the tertiary winding 15 is so located that its magnetic coupling with the primary winding 14 is weak; the tertiary winding 15 interlinks the leakage flux of the secondary winding 19 with respect to the primary winding 14; the load L is connected through the second rectifier circuit SR to the tertiary winding 15; and the rectification circuit operates only during the scanning period. More specifically, the tertiary winding 15 is formed in a position wherein the ratio of the leakage fluxes of the secondary winding 19 under the influence of either both the primary and tertiary windings 14 and 15 or the primary winding 14 alone is less than 90%, as a result of which the ringing ratio value R of the secondary winding 19 is improved by more than 10% in comparison with the conventional fly-back transformer as described below. In addition, the fly-back transformer of the above embodiments is completed by connection of the outgoing line of each of the windings except for the high-voltage output end of the secondary winding 19 to the pin terminal of a terminal strip (not shown), which is integrally formed with, for example, a low-voltage coil bobbin 12 and by insulating each of the entire windings with a coating of resin or the like.

Figure 5:
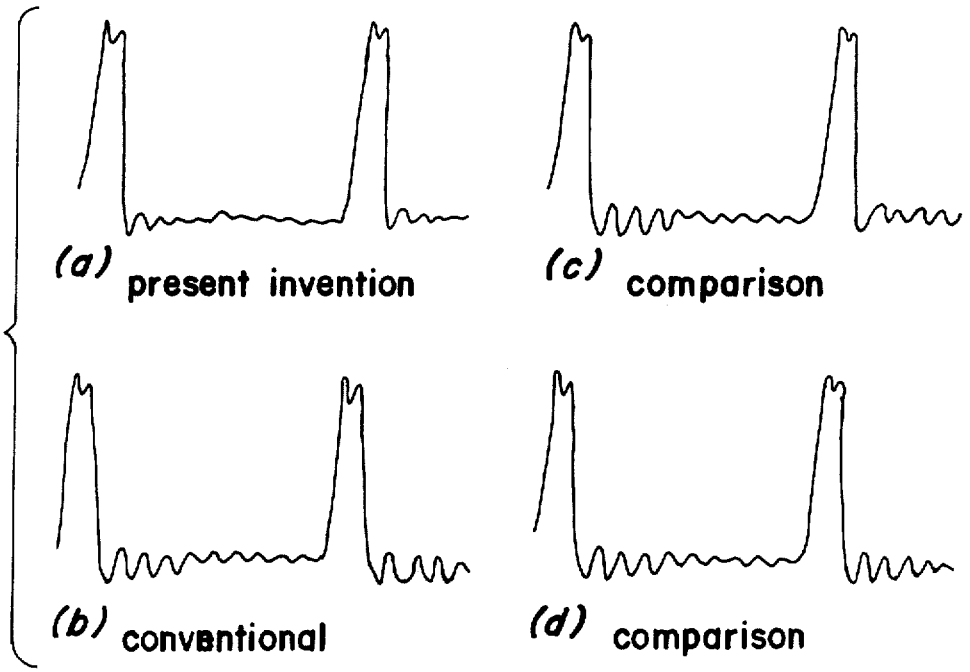
FIG. 5 shows the induction waveforms of the secondary winding of the fly-back transformer in the mounting circuit diagram of FIG. 3, (a) showing an induction waveform of the fly-back transformer of FIG. 2, (b) showing an induction waveform of the conventional fly-back transformer, (c) and (d) showing induction waveforms each illustrating the operation of the tertiary winding.

As described above, the fly-back transformer of the present invention is associated with a horizontal deflection circuit HD connected onto the side of the primary winding 14, the first rectifier circuit FR connected onto the side of the secondary winding 19 and the second rectifier circuit SR connected onto the side of the tertiary winding 15 in such a manner that the second rectification circuit SR is operated to commutate only during the scanning period of the horizontal deflection circuit HD. A rectangular wave pulse signal of, for instance, 15.75 KHz is applied as a horizontal synchronizing signal in a known manner upon the input side of the primary-side horizontal output transistor Tr of such a circuit construction as described above. The load L is connected to the tertiary winding 15. The pulse waveform that is induced in the secondary winding 19 when a fifth tuning has been made is illustrated in FIG. 5(a). The ringing ratio value $R_1$ obtained from the waveform of FIG. 5(a) is 11.0%. To compare the fly-back transformer of the present invention constructed as shown in FIG. 2 with the conventional one, the tertiary winding 15 of FIG. 2 would be directly wound on the primary winding 14 in the conventional unit through removal of the insulating material 13, the pulse waveform induced in the secondary winding 19 being as shown in FIG. 5(b). The ringing ratio value $R_2$ obtained from the waveform of FIG. 5(b) is 16.5%. Thus, the fly-back transformer of the present invention has a better ringing ratio than the conventional transformer.

The great improvement in ringing ratio described above is due to reduction in ringing amplitude alone without any change in shot pulse waveform, as is apparent from comparison of FIGS. 5(a) and 5(b). The smaller ringing amplitude is caused by the higher frequency. The reasons why only the ringing waveform changes without any change in the shot pulse waveform are as follows. The second rectifier circuit SR of the tertiary winding 15 according to the present invention performs the scanning period rectification, and the load L is connected to the tertiary winding 15. Thus, th AC component across the tertiary winding 15 is short-circuited by the capacitor $C_1$ in the second rectifier circuit SR only during the scanning period, i.e., when the ringing occurs. Since the tertiary winding 15 operating as described above is adjacent to the secondary winding 19, the inevitable leakage flux of the secondary winding 19 with respect to the primary winding 14 is adapted to interlink the tertiary winding 15. However, since the AC component across the tertiary winding 15 is short-circuited only during the scanning period as described above, the current which negates the interlinked magnetic flux and thus substantially reduces the inevitable leakage flux of the secondary winding 19 flows in the tertiary winding 15 only during the scanning period. On the other hand, the ringing frequency of the scanning period is the resonance frequency of a series resonance circuit of leakage inductance L1 and stray capacity Cs of the secondary winding 19. As is well known, it is determined by $$f = \frac{1}{2\pi\sqrt{Ll \cdot Cs}}$$

and thus the reduction of leakage flux of the secondary winding 19 raises the resonance frequency, that is, the ringing frequency. Since the AC component across the tertiary winding 15 is short-circuted only during the scanning period, the shot pulse waveform is not affected, so that the ringing amplitude is decreased.

To prove through experiments the function of the tertiary winding 15, the load L of the tertiary winding 15 of each of the fly-back transformers the waveforms of which are shown in FIGS. 5(a) and (b) is removed, and the waveform induced in the secondary winding 19 is observed. The results are shown in FIGS. 5(c) and (d), corresponding to (a) and (b). As is apparent from these waveforms, the waveform induced in the secondary winding 19 remains almost the same in shape when the load of the tertiary winding 15 is removed, with the small difference of 16.0% versus 17.0% between the ringing ratios $R_3$ and $R_4$. However, when the load L is connected to the respective tertiary windings 15, the respective ringing ratios $R_1$ and $R_2$ become 11.0% and 16.5%, as described above. The fly-back transformer of the present invention is improved by 30%, while the conventional transformer remains almost unchanged. The operation of the tertiary winding 15 will be clearly understood from the above experiments.

Figure 6:
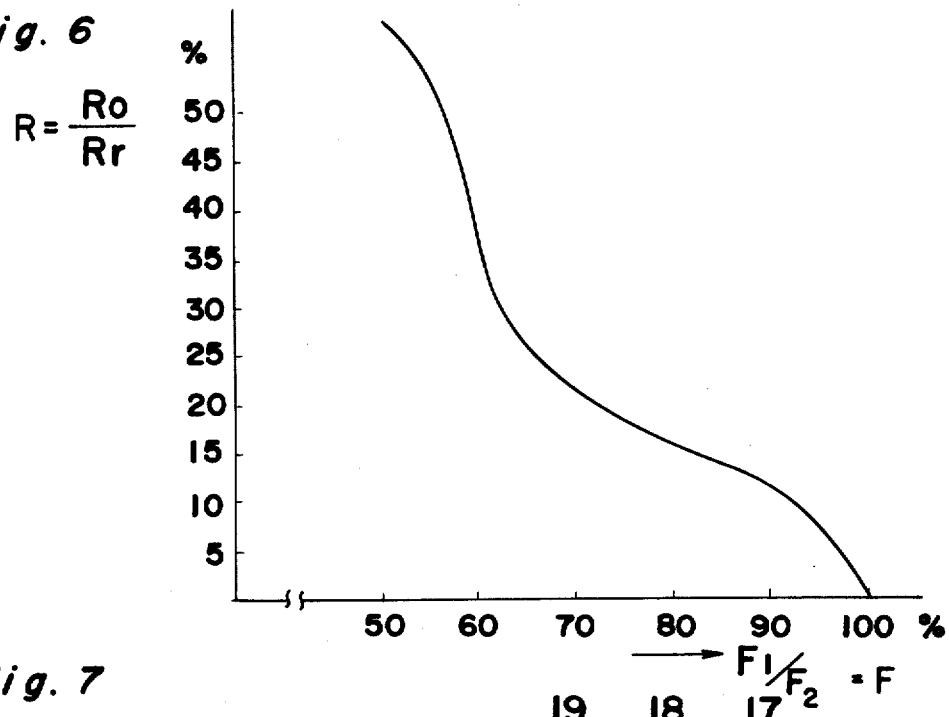
FIG. 6 is a graph showing the relation of the ringing ratio value R and the leakage flux F of the secondary winding for the fly-back transformer of FIG. 2.

In addition thereto, the other experiments in connection with the ringing ratio value R and the leakage flux F of the secondary winding 19 are conducted with the result shown in the graph of FIG. 6, the axis of abscissa of which represents the ratio $F_1/F_2$ of the leakage fluxes of the secondary winding 19 under the influence of either both the primary and tertiary windings 14 and 15 or the primary winding 14 alone, while the axis of ordinate shows the improving efficiency $R_0/R_r$ the ratio between the ringing ratio values of the secondary winding 19 under the influence of either the primary and tertiary windings 14 and 15 or the primary winding 14 alone. In the graph, $F_1$ is an inductance measured by the second winding 19 when the primary and tertiary windings 14 and 15 are short-circuited, i.e., when the load L connected to the tertiary winding 15 through the diode $D_1$ is short-circuited, and $F_2$ is an inductance measured by the second winding 19 when only the primary winding 14 is short-circuited, i.e., the condition of non-existence of the tertiary winding 15. $R_0$ is the ringing ratio of a shot pulse wave crest value and the ringing wave crest value of the secondary winding 19 under the influence of the primary winding 14 alone, and $R_r$ is a ringing ratio between the short pulse wave crest value and the ringing wave crest value of the secondary winding 19 under the influence of both the primary and tertiary windings 14 and 15. Accordingly, the ratio $F_1/F_2$ indicates the percentage of the leakage flux to be discharged from the tertiary winding 15 to the secondary winding 19, and the ratio $R_0/R_r$ shows the improvement in ringing ratio due to the tertiary winding 15. The graph of FIG. 6 is a roughly cubic curve having a pair of inflection points at values of $F_1/F_2$ of about 90% and 70%. If the ratio $F_1/F_2$ is less than 90%, the ratio $R_0/R_r$ is more than 10%, whereby the needless radiation or raster ringing of the television receiver is drastically reduced so that the filter can be eliminated.

The fly-back transformer of the present invention has been described above in construction and operational effect. However, the fly-back transformer of the present invention is not restricted to the construction transformer of FIG. 2, which shows a principle embodiment of the present invention.

Figure 7:
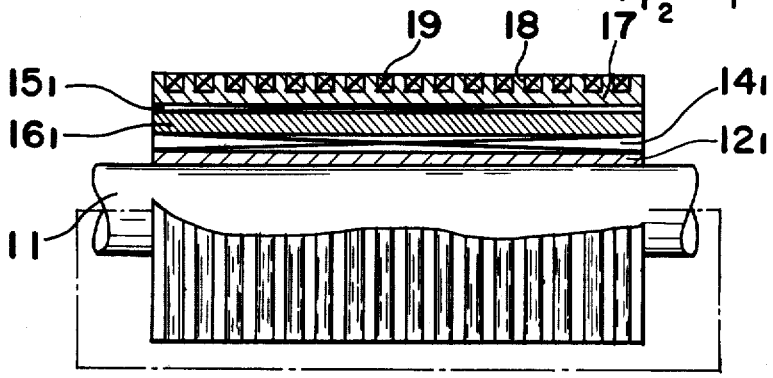
FIGS. 7 to 20 are cross-sectional views showing essential portions of various embodiments of the fly-back transformer in accordance with the present invention.
Figure 8:
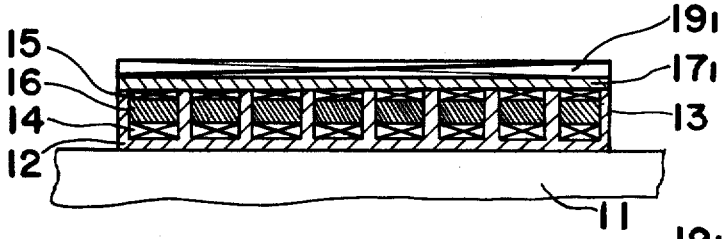
Figure 9:
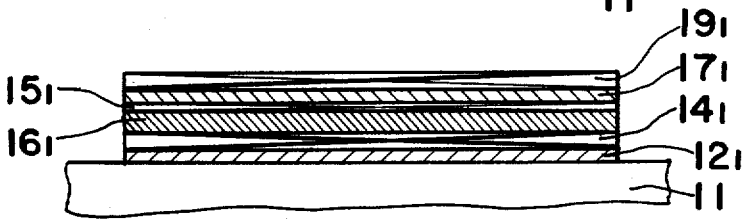

Although all of the windings 14, 15 and 19 of FIG. 2 are divided type windings split-wound into the channels 13 and 18 of bobbins 12 and 17, any or all of the windings 14, 15 and 19 can be of flat layer type having a pluraltiy of solenoid windings as shown in FIGS. 7, 8 and 9. The fly-back transformer of FIG. 7 has a cylindrical low-voltage coil bobbin $12_1$ with no channels, a primary winding $14_1$ of flat pattern formed on the bobbin $12_1$ and a tertiary winding $15_1$ of flat pattern formed on the primary winding outside a cylindrical thick insulating sheet $16_1$. The fly-back transformer of FIG. 8 has a cylindrical high-voltage coil bobbin $17_1$ with no channels and a secondary winding $19_1$ of flat pattern formed on the bobbin. The fly-back transformer of FIG. 9 comprises all of the components $12_1$, $14_1$, $15_1$, $16_1$, $17_1$ and $19_1$ of FIGS. 7 and 8 as mentioned above. So far as the tertiary winding 14 is constructed in the same location as in of FIG. 2, the same effect as that of FIG. 2 can be expected in all of the embodiments of FIGS. 7, 8 and 9.

Figure 10:
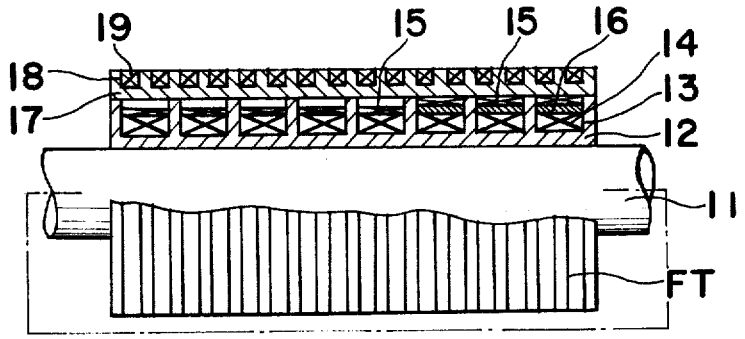

According to the fly-back transformer shown in FIG. 10, at least one portion of the tertiary winding 15 is strongly coupled with the primary winding 14 and wound in series-connected construction, while the remaining portion of the tertiary winding 15 is so positioned that its coupling with the primary winding 14 is weak and the tertiary winding interlinks the leakage flux of the secondary winding with respect to the primary winding 14 as shown in the embodiment of FIG. 2, etc. In other words, the tertiary winding 15 is divided into two portions, i.e., one directly wound on the primary winding 14 to provide close coupling with the primary winding 14 and the other wound outside a thick layer of an insulating material 16 on the primary winding 14 to provide weak coupling with the primary winding 14, the windings of the two portions being in the ratio of five to three. The pulse waveform induced in the secondary winding 19 of this embodiment has in a shape similar to that of FIG. 5(a), and the ringing ratio value R obtained from the waveform is 12.5%.

Figure 11:
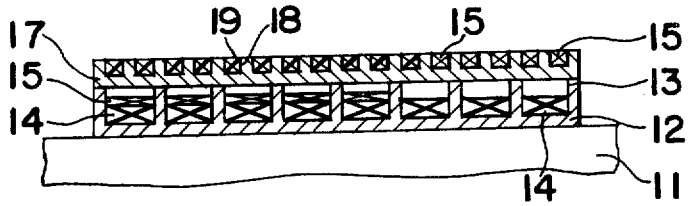

Experiment has showed that, as current flowing through the tertiary winding 15 increases with the load L, a declined deformation in the right shoulder of the shot pulse waveform of the secondary winding 19 occurred, with a bad effect upon the highvoltage regulation. This embodiment of the present invention provides a fly-back transformer which does not allow distortion in the shot pulse waveform induced in the secondary winding 19 even when the load L of the tertiary winding is large. In this embodiment, the dispersion ratio between the tertiary winding 15 near the secondary winding 19 i.e., on the outer bobbin 17 (see FIG. 11) or on the outer periphery of the low-voltage coil bobbin 12 (see FIGS. 10, 12, 14, 16, 17 and 20) and the tertiary winding 15 near the primary winding 14 i.e., in contact with it (FIGS. 10 and 11) or at the bottom of deep channels 13 in the inner bobbin 12 (see FIG. 13) is selected so that the entire transformer can be constructed with optimum characteristics. When the tertiary winding 15 is constructed as shown in FIG. 10, the high-voltage regulation does not deteriorate even when the load L connected to the tertiary winding 15 is large.

It is to be noted that the ringing ratio R can be properly adjusted by proper choice of the fraction of the tertiary winding 15 to be wound near the primary winding 14 and the fraction of the tertiary winding 15 wound near to the secondary winding 19 or through the binding degree, etc. of the secondary winding 19 with the tertiary winding 15 wound near the secondary winding 19. Practically, the selection of ringing ratio R is made on the balance of the other characteristics of the fly-back transformer.

Figure 12:
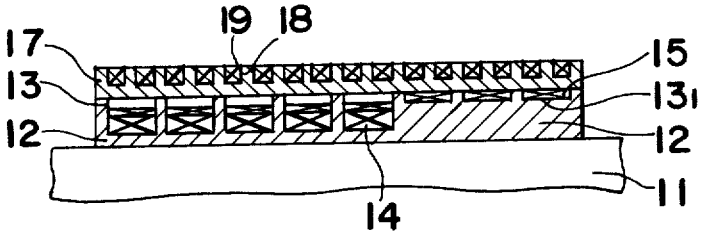

The part of the tertiary winding 15 wound near the secondary winding 19 can have any of several positions in the transformer. For example, referring to FIG. 11, the portion of the tertiary winding 15 near the secondary winding 19 is wound on one end of the high-voltage coil bobbin 17 on which the secondary winding 19 is wound. Referring to FIG. 12, the tertiary winding 15 wound near the secondary winding 19 is split-wound in the shallow channels $13_1$ without insulating material. In each case, the ringing ratio R can be made small for the same reasons as apply to the embodiment shown in FIG. 10, although with minor variation in the amount of improvement of R possible.

Each of the disclosed winding configurations can be used with solenoidal and other windings. Furthermore, it is possible to locate the tertiary winding 15 at the low-potential end of the secondary winding 19 within limits imposed by the withstand voltage.

In short, according to the present invention, part of the tertiary winding 15 is wound in such a position that it is strongly coupled with the primary winding 14 and the remaining part is wound in such a position that the coupling is weak and it interlinks the leakage flux of the secondary winding 19 with respect to the primary winding 14. The output of the tertiary winding 15 is normally rectified during the scanning period through the rectifier circuit to the load. The tertiary windings 15 in the above embodiments can be employed to take out signals of AFC, AGC, etc. and to draw out the secondary B power source, or simply for purpose of improving the ringing ratio R as described above. When the tertiary windings 15 of the fly-back transformer are to be used to draw out signals such as AFC, AGC, etc. to the external electric circuit, the second rectifier circuit and the load L of impedance elements such as resistors can be integrated with the fly-back transformer.

Since, as a practical matter, the choice of the optimum ringing ratio R must be balanced against the other design requirements of the fly-back transformer, the transformers shown in FIGS. 13 to 19 are the most practical.

Figure 13:
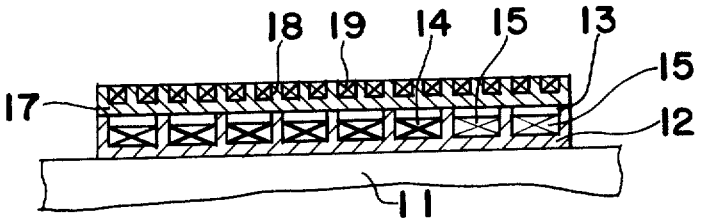

In FIG. 13, the tertiary winding 15 is wound parallel to the primary winding 14, at the bottom of channels 13 at one end of the low-voltage coil bobbin 12, without insulating material. The secondary winding 19 is wound outside both the primary winding 14 and the tertiary winding 15. In this embodiment, the tertiary winding 15 is desired to be wound at the low-potential end of the secondary winding 19, within the limitations imposed by the withstand voltage.

Figure 14:
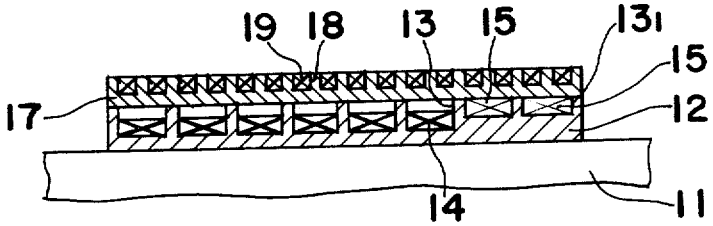

In FIG. 14, the channels $13_1$ in which the tertiary winding 15 of FIG. 13 are wound are shallow so that the tertiary winding 15 is near the secondary winding 19, in order to improve the interlink with the leakage flux of the secondary winding 19.

Figure 15:
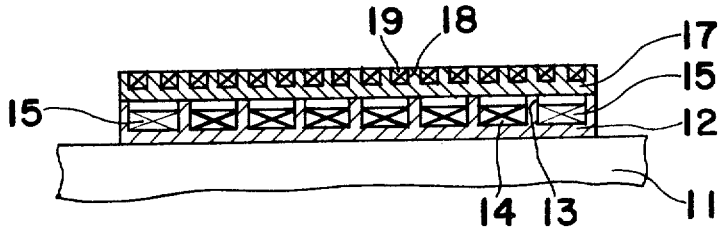

In FIG. 15, the tertiary winding 15 is located in channels 13, half of the tertiary coil being at each end of the primary coil 14.

Figure 16:
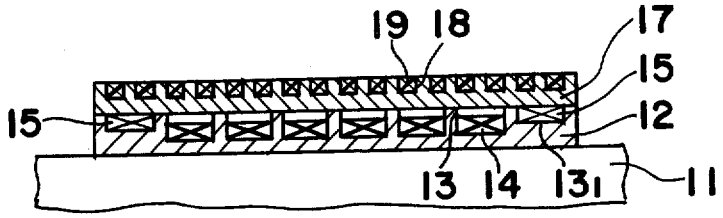

In FIG. 16, the configuration of FIG. 15 is used, but the channels in which the tertiary coil is wound are made shallow, as in FIG. 14.

Figure 17:
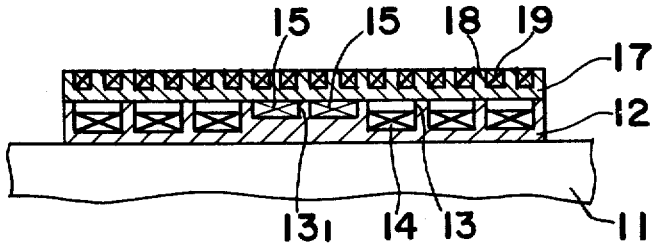

In FIG. 17, the tertiary coil is placed in shallow channels $13_1$ in the approximate middle portion.

Figure 18:
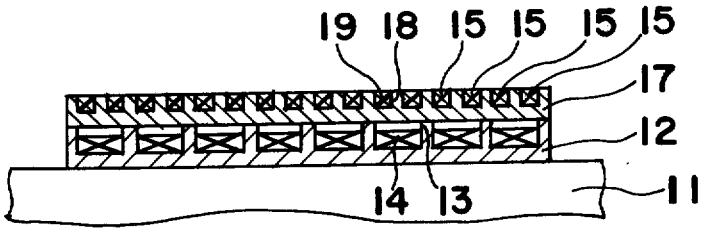

In FIG. 18, the tertiary winding 15 is located in channels 18 in the low-potential end *of the* high-voltage coil bobbin 17.

Figure 19:
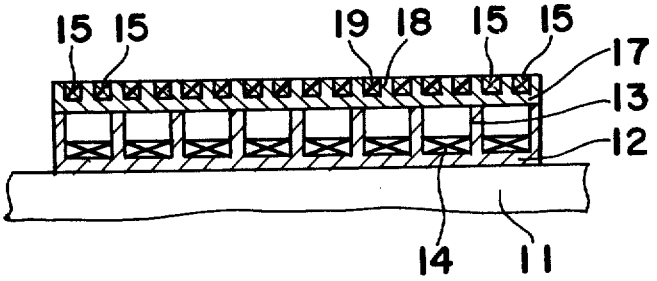

In FIG. 19, the tertiary winding 15 is located in channels 18 at each end of the [low] *high*-voltage coil bobbin 17, parallel to the secondary winding 19. In each of the above configurations, the ringing ratios can be improved for the same reasons as pertain to the configuration of FIG. 2, although some differences exist among the above embodiments.

Figure 20:
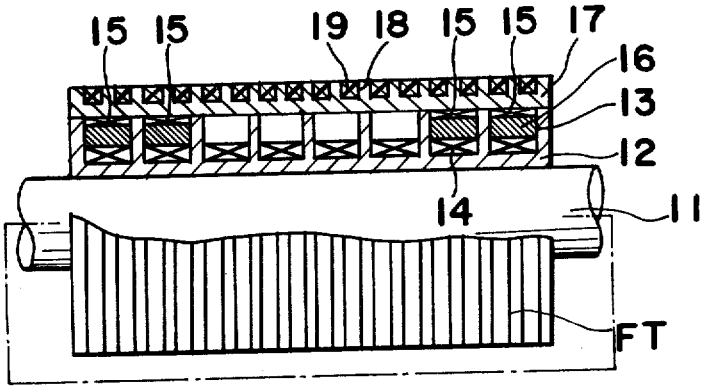
Figure 21:
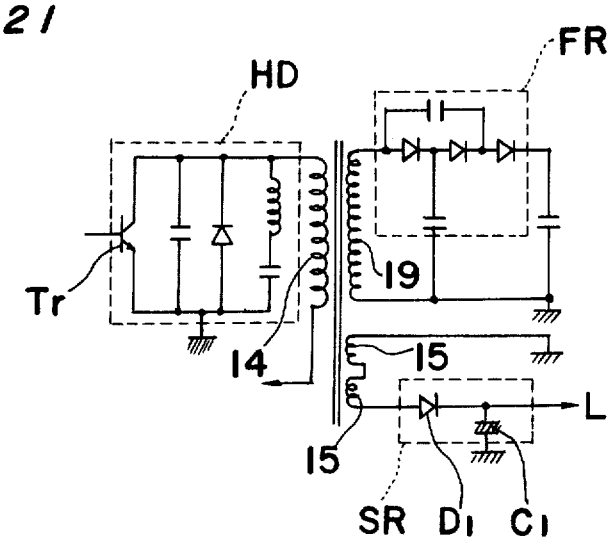
FIG. 21 is a mounting circuit diagram illustrating the operational effect of the fly-back transformer of FIG. 20.

In FIG. 20, at least one portion of the tertiary winding 15 is wound at both ends of the inner bobbin [17] *12* but near the secondary coil 19, so that the coupling with the primary winding 14 is weak and the tertiary winding 15 interlinks the leakage flux of the secondary winding 19 to the primary winding 14, and the tertiary winding 15 is normally rectified during the scanning period. The part of the tertiary windings 15 at each end is wound through a thick insulating material 16 such as resin film or the like to weaken the coupling with the primary winding 14. The two parts are near the secondary winding 19 and are connected in series as shown in FIG. 21. The winding direction of the tertiary coil 15 is optional, since the tertiary winding 15 is used to allow a so-called scanning period rectification to be performed. The pulse waveform induced in the secondary winding of this embodiment has a ringing ratio value R of 11.5%. Also, in this embodiment, solenoidal or other suitable windings can be used for the tertiary coil 15, not only splitwindings.

Figure 22:
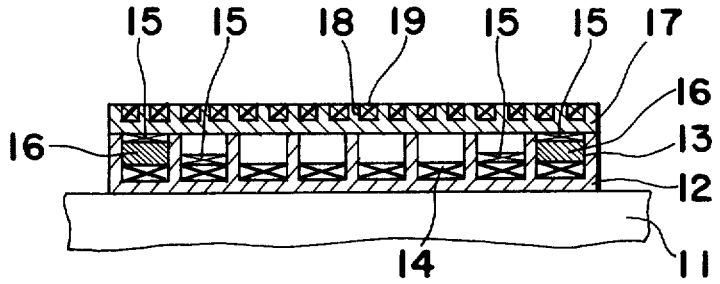
FIGS. 22 and 23 are cross-sectional views showing essential portions of other embodiments of the fly-back transformer in accordance with the present invention.

Also, note that, as in FIG. 22, while at least one portion of the tertiary winding 15 is located near the secondary coil 19, where its coupling with the primary winding 14 is weak, and interlinks the leakage flux of the secondary winding 19 with respect to the primary winding 14, the remaining portion of the tertiary winding 15 can be wound near the primary coil 14 so that its coupling with the primary winding 14 is strong, and can be connected in series with the first portion. When the tertiary windings 15 are disposed as in FIG. 22, superior high voltage regulation results and does not deteriorate even with a large load connected to the tertiary winding 15. That is, when the entire tertiary coil 15 is near the secondary coil 19 and the tertiary winding 15 interlinks the leakage flux of the secondary winding 19 with respect to the primary winding 14, a downward distortion occurs in the right shoulder of the shot pulse waveform from the secondary winding 19 when the current flowing through the tertiary winding 15 increases with the load, with a bad effect on the high voltage regulation. When the tertiary winding 15 is positioned in FIG. 22, no distortion of such shot pulse waveform occurs even with a large load.

It should also be noted that the tertiary winding 15 of the present invention is provided at both ends of the transformer, where the leakage flux of the secondary winding 19 with respect to the primary winding 14 is highest. However, when the parts of the tertiary coil 15 located at the ends are connected in series as described in connection with FIG. 20, the tertiary winding 15 is adapted to interlink the leakage flux of the secondary winding 19 except at the ends. In this configuration, the leakage flux of the secondary winding 19 is a maximum if the wire connecting the end portions of the tertiary coil 15 is wound around the primary winding 14 several times in the middle portion of the transformer. Thus, more effective method is ensured.

The tertiary windings 15 at each end of the transformer need not be connected in series. Each can be provided with a separate rectifier circuit and a separate load, and operated independently of each other. Again, they can be connected in parallel.

In short, the output of the tertiary windings 15 must be rectified during the scanning period. The load connected through the rectifier circuit to the tertiary winding 15 can be an external electric circuit or it can be merely an impedance element such as a simple resistor. The load connected to the tertiary winding 15 can be used so that the tertiary winding 15 improves the ringing ratio, instead of drawing the secondary B power source as in the case of impedance element, etc.

Another embodiment (see FIG. 23) is a fly-back transformer of multi-singular type characterized in that at least one portion of tertiary winding 15 is so located that it interlinks the leakage flux with respect to the primary winding 14 of at least one of the secondary windings 19 divided in AC manner by diodes $D_2$, with weak coupling of the tertiary winding 15 with the primary winding 14, and that the tertiary winding 15 is rectified during the scanning period. The transformer of this embodiment includes the low-voltage coil bobbin 12 having a plurality of winding channels 13 in its outer surface, the low-voltage coil bobbin 12 being engaged with the core 11. The primary winding 14 is split-wound along each of the channels 13 of the low-voltage coil bobbin 12 and is divided into three portions connected in series. A plurality of tertiary windings 15, for drawing the secondary B power source, are wound one at one end of each of the three primary coils 14 and all three connected in parallel. The tertiary coils 15 are wound through thick insulating material 16 in order to make the coupling with the primary coils 14 weak and in order that the tertiary coils shall be near the secondary coil 19. The high-voltage coil bobbin 17 is engaged with the low voltage coil bobbin 12 and has a plurality of winding channels 18 in its outer surface, the secondary windings 19 being split-wound in each of the winding channels 18 and being divided into three portions, each of which is located outside of the corresponding portions of the primary and tertiary coils 14 and 15 (see FIG. 23). Each of the three sections of secondary coil 19 is connected at its high-voltage end to a diode $D_2$, which is located in a winding channel 18 of the high-voltage coil bobbin 17 and connected in series to both adjacent secondary coils 19 (see circuit diagram of FIG. 24). The diodes $D_2$ divide the secondary windings 19 in AC manner and are adapted to having the DC high voltage drawn from their respective cathode sides.

These tertiary windings 15 are used so that a so-called scanning period rectification may be performed, wherein the rectification is performed only during the scanning period when the load L is connected through the second rectifier circuit SR. Various constructions for the circuit that is to perform the scanning period rectification are possible with different winding directions for the tertiary coils 15 and with various connecting directions of the rectification elements of the rectifier circuits connected thereto. In short, the circuit must be constructed so that rectification elements such as diodes, etc., constituting the rectifier circuits connected to the tertiary windings 15 are not conductive during the fly-back line period, but only during the scanning period.

Figure 23:
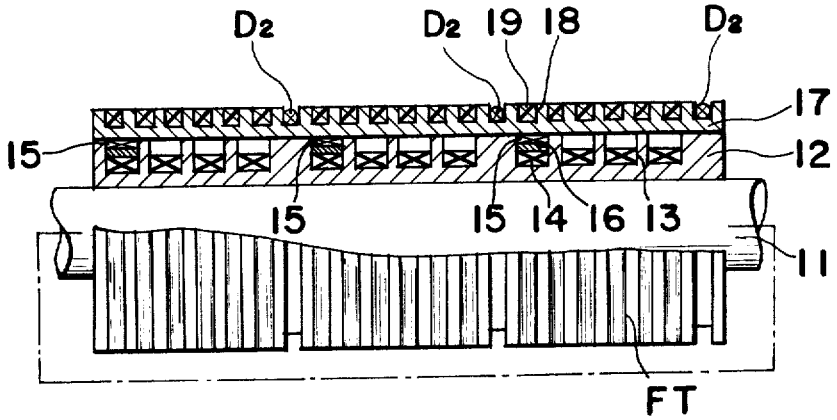
Figure 24:
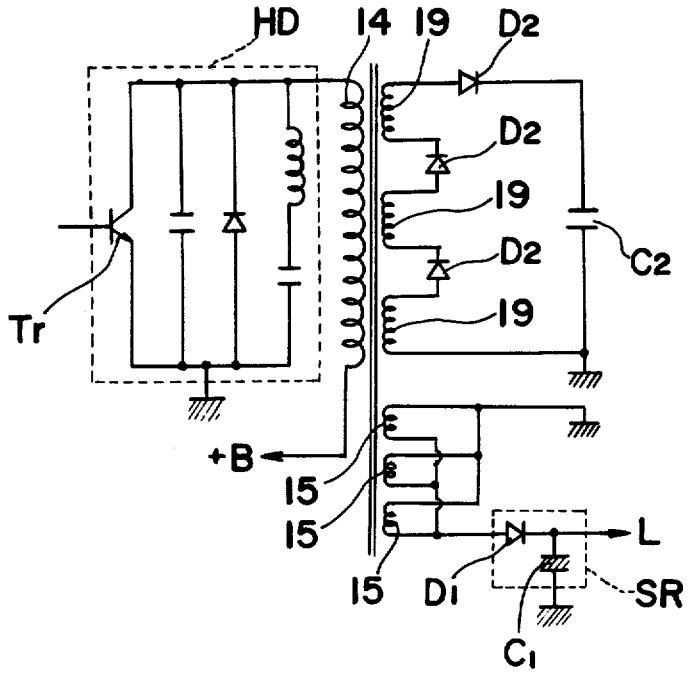
FIG. 24 is a mounting circuit diagram illustrating the operational effect of the fly-back transformer of FIG. 23.
Figure 25:
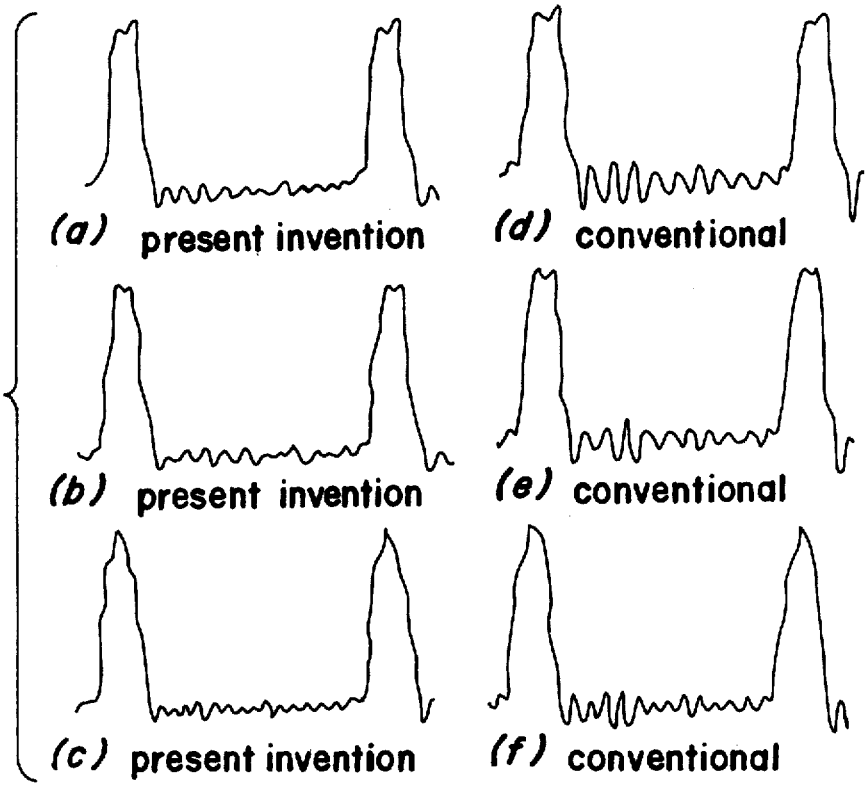
FIG. 25 shows the induction waveforms of the secondary winding of the fly-back transformer of FIG. 23, (a) to (c) showing the induction waveforms of the fly-back transformer of FIG. 23, (d) to (f) showing the induction waveforms of the conventional embodiment.

As shown in the circuit diagram of FIG. 24, the horizontal deflection circuit HD is connected onto the side of the primary winding 14 of the fly-back transformer. A capacitor $C_2$ is connected in parallel with the secondary windings 19 and diodes $D_2$. The second rectifier circuit SR is connected across each of the parallel-connected tertiary coil 15. As described above, the tertiary coils 15 are so connected that the rectifier circuit will perform the scanning period rectification. Rectangular wave pulse signals of 15.75 KHz are applied to the input of the primary-side horizontal output transistor Tr. The load L is connected to the output of the second rectifier circuit SR. The pulse waveforms induced in the three secondary coils 19, when a fifth tuning has been made on two of the secondary coils and a seventh tuning on the other secondary coil are shown in FIGS. 25(a), (b) and (c), corresponding to the three secondary coils respectively. The ringing ratio values R obtained from these waveforms are 12.5%, 9.5% and 12.0% respectively. To compare the fly-back transformer of the present invention with the conventional design in which all the tertiary windings 15 are near to the primary winding 14, the tertiary windings 15 in FIG. 23 are directly wound on the primary winding 14 through removal of the insulating material 16. The pulse waveforms now induced in the secondary coils are shown in FIGS. 25(d), (e) and (f). The ringing ratio values R obtained from the waveforms are 27.0%, 20.5% and 19.5%, inferior to the values for the present invention. In the observation of the above waveforms, the fifth and seventh hybrid tunings are made on the secondary winding in order to improve the output waveforms on the secondary, to improve the efficiency of the transformer. However, it is needless to say that the hybrid tuning is not restricted to the fifth and seventh combinations, but can be applied to other proper combinations as required.

The great improvement in ringing ratio as described hereinabove is due solely to reduction in ringing amplitude and not to any changes in shot pulse waveform, as is apparent from comparison of FIGS. 25(a), (b) and (c) with FIGS. 25(d), (e) and (f). The smaller ringing amplitude is due to the higher frequency. The reasons only the ringing waveform changes without any change in the shot pulse waveform are as follows. The rectifier circuit SR performs the scanning period rectification and the load L is connected to the tertiary coils 15. Thus, the AC component of the output of the tertiary windings 15 is short-circuited by the capacitor $C_1$ only during the scanning period, that is, when ringing is produced. Since the tertiary windings 15 operating as described above are near the secondary windings 19, the inevitable leakage flux of the each secondary winding 19 with respect to the primary winding 14 will interlink with the tertiary windings 15. However, since the AC component of the output of the tertiary windings 15 is short-circuited only during the scanning period, the current which opposes the interlinked magnetic flux flows in the tertiary windings 15 and so reduces substantially the flux only during the scanning period and the shot pulse waveform is therefore not affected. On the other hand, each of the secondary winding ringing frequencies of the scanning period is the resonance frequency of a series resonance circuit of the respective leakage inductances L1 and stray capacities Cs of the secondary windings 19. As is well known, it is determined by $$f = \frac{1}{2\pi\sqrt{Ll \cdot Cs}};$$

thus the leakage flux of each secondary winding is reduced and the resonance frequency, i.e., the ringing frequency, raised.

Figure 26:
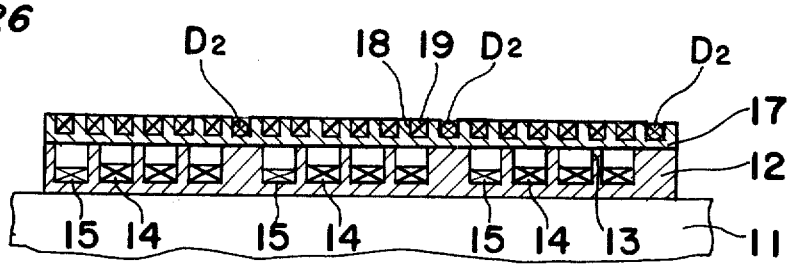
FIGS. 26 to 30 are cross-sectional views showing essential portions of yet other embodiments of the fly-back transformer in accordance with the present invention.
Figure 27:
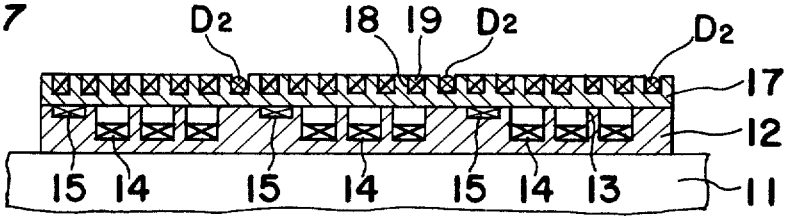
Figure 28:
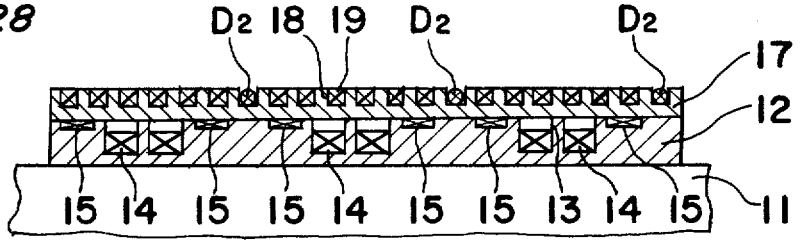

Since, as a practical matter, the desirability of the optimum ringing ratio must be balanced against other design requirements of the fly-back transformer, the transformers shown in FIGS. 26 to 30 are more practical than that of FIG. 23. FIGS. 26 to 28 in particular are superior in effect to that of FIG. 23.

In FIG. 26, each tertiary coil 15 is formed, parallel to the primary winding 14, in a channel 13 at one end of one of the divided primary windings 14 of the low-voltage coil bobbin 12. No insulating material is used. The three secondary windings 19 respectively cover the primary and tertiary coils 14 and 15. In this embodiment, the tertiary windings 15 should be wound at the low-potential ends of the secondary coils 19, considering the withstand voltage as in FIG. 23.

In FIG. 27, the channels 13 along which the tertiary windings 15 are wound are shallow so that the tertiary windings 15 are near the secondary windings 19, in order to improve the interlink of the secondary winding with the leakage flux. In FIG. 27, the tertiary coils, wound at the low-potential ends of the primary windings 14, can instead be wound at the high-potential ends. In FIG. 28, the tertiary coils 15 are located at both the low-potential and the high-potential ends of each of the primary coils 14. This could also be done in FIG. 26.

Figure 29:
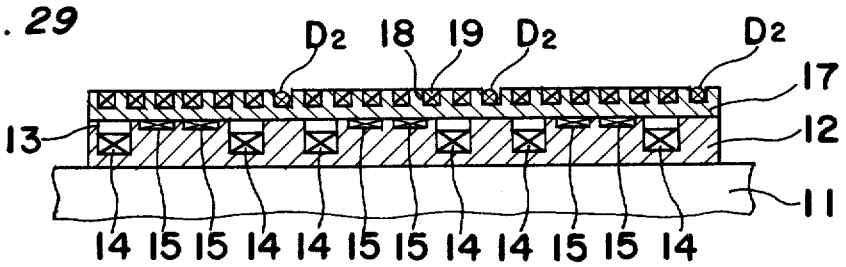

In FIG. 29, the shallow winding channels in the middle portion of each of the three primary windings 14 contain the tertiary windings 15.

Figure 30:
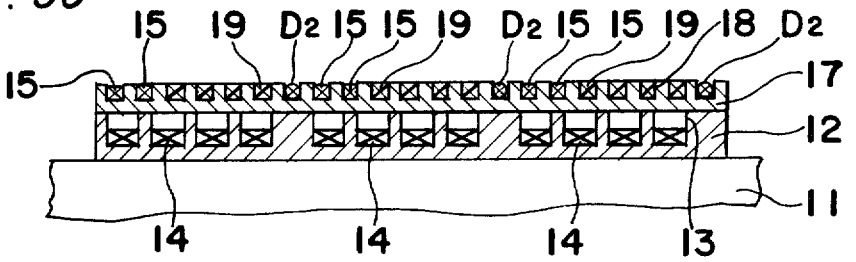

In FIG. 30, the tertiary windings 15 are located in winding channels 18 at low-potential end of each of the secondary windings 19 on the high-voltage coil bobbin 17.

These five configurations all tend to reduce the ringing ratio, although some differences exist among them.

Although in these embodiments, the number of tertiary windings 15 equals the number of the secondary windings 19, such need not be the case. For example, there may be only one tertiary winding even if several secondary windings 19 are provided; in this embodiment, needless to say, it is most effective to locate the tertiary coil directly above the secondary winding that has the largest distributed capacity with respect to ground, i.e., on the secondary winding that would have the largest ringing amplitude. In this embodiment, the secondary windings not provided with tertiary windings are not improved in ringing ratio R. In a fly-back transformer having a plurality of secondary windings 19 divided in AC manner, like the multi-singular type, the number of the remaining secondary windings 19 which [interface] *interfere* with each other is reduced correspondingly when only one secondary winding is improved in ringing ratio R. Thus, the ringing ratio R can easily be adjusted by means of a conventional turning system, thus allowing the ringing ratio R of the entire fly-back transformer to be reduced.

When a tertiary winding is thus located adjacent to only one secondary winding, additional tertiary windings may be located so as to be strongly coupled with the primary winding, as in conventional fly-back transformers all the tertiary windings being connected in series, although they should not be located where they would be coupled weakly with the primary coil 14 and would interlink the leakage flux of the secondary winding 19 with respect to the primary winding 14.

When one tertiary winding 15 is split into two or more sections physically separated from each other, the high-voltage regulation can be improved in such a way that it will not deteriorate even with a large load L. Each tertiary winding 15 can be split into two sections in this manner, even when a tertiary winding is provided to correspond to each of the secondary [winding] *windings* 19.

It should be noted that when a plurality of tertiary windings 15 is provided, as in FIG. 23, they may be connected either in parallel or in series.

The output of the tertiary windings 15 must be rectified during the scanning period. The load L connected through the second rectifier circuit SR to the tertiary coils 15 may be either an external electric circuit or merely a single impedance element such as a resistor, since the original object of the tertiary winding 15 is to serve as the secondary B power source. As the load L connected to the tertiary winding 15 is an impedance element or the like, the tertiary winding 15 may be used to improve the ringing ratio or to draw out the output signal in addition to being the secondary B power source. When the tertiary winding is used only to improve the ringing ratio, the rectifier circuit SR and the load L of the impedance elements may be integrated with the fly-back transformer.

Various elements of the fly-back transformer of the present invention have been described above. The present invention has the novel advantages that adjustments may be made extremely easily, and the ringing ratio can be reduced without any effect upon the shot pulse waveform induced in the secondary winding even when the load of the tertiary winding is large. In addition, the present invention has the advantage over the prior art that unnecessary radiation is minimized when a fly-back transformer such as is described is incorporated in the television image receiver.

Although the present invention has been fully described in connection with the preferred embodiments thereof with reference to the accompanying drawings, it should be noted that various changes and modifications will be apparent to those skilled in the art. Applicants therefore prefer not to be limited to the preferred embodiments herein described.

What is claimed is:

1. A fly-back transformer for use in a horizontal deflection circuit of a television receiver, the operation of said [deflector] *deflection* circuit being cyclical, and each cycle of said circuit being divided into a scanning period and a [retract] *retrace* period, said transformer comprising:

a core member, a first coil bobbin provided on said core member;

a primary winding for low voltage supply mounted on said first coil bobbin;

a second coil bobbin located on said first coil bobbin;

a secondary winding for producing a high-voltage output responsive to an electromagnetic field generated by said core and located on said second coil bobbin;

a tertiary winding for generating a low-voltage output responsive to an electromagnetic field generated by said core and located at a position wherein the magnetic coupling of said tertiary winding to said primary winding is small in comparison with the magnetic coupling of said tertiary to said secondary winding, and wherein the leakage flux of said secondary winding with respect to said primary winding interlinks with said tertiary winding; and a commutating circuit connected to said tertiary winding so as to commutate the output of said tertiary winding only during said scanning period of said horizontal deflection circuit.

2. A fly-back transformer as claimed in claim 1, wherein said primary winding is formed of a plurality of solenoid windings connected in series, each of said solenoid windings comprising a plurality of turns and each of said solenoid windings being separated from the others by at least a small distance.

3. A fly-back transformer as claimed in claim 1, wherein said secondary winding is formed of a plurality of solenoid windings connected in series, each of said solenoid windings comprising a plurality of turns and each of said solenoid windings being separated from the others by at least a small distance.

4. A fly-back transformer as claimed in claim 1, wherein said tertiary winding is formed of a plurality of solenoid windings connected in series, each of said solenoid windings comprising a plurality of turns and each of said solenoid windings being separated from the others by at least a small distance.

5. A fly-back transformer as claimed in claim 1, wherein said first coil bobbin has a plurality of circular channels on the outer surface thereof, and said primary winding is split-wound into said channels.

6. A fly-back transformer as claimed in claim 1, wherein said first coil bobbin has a plurality of circular channels on the outer surface thereof, and said primary winding is split-wound into some of said channels and said tertiary winding is split-wound into the rest of said channels.

7. A fly-back transformer as claimed in claim 1, wherein said first coil bobbin has a plurality of circular channels on the outer surface thereof, said primary winding is split-wound into said channels, and said tertiary winding is split-wound over said primary winding over an insulating material which is located over said primary winding and within said channels.

8. A fly-back transformer as claimed in claim 1, wherein said second coil bobbin has a plurality of circular channels on the outer surface thereof, and said secondary winding is split-wound into said channels.

9. A fly-back transformer as claimed in claim 1, wherein said second coil bobbin has a plurality of circular channels on the outer surface thereof, and said secondary winding is split-wound into some of said channels and said tertiary winding is split-wound into the rest of said channels.

10. A fly-back transformer as claimed in claim 1, wherein said tertiary winding is located relatively close to said secondary winding and relatively far from said primary winding, whereby said tertiary winding is strongly coupled to said secondary and weakly coupled to said primary winding.

11. A fly-back transformer as claimed in claim 1, wherein said tertiary winding is wound in a winding direction opposite to that of said secondary winding.

12. A fly-back transformer as claimed in claim 1, wherein said tertiary winding is so located that the ratio of the leakage flux of said secondary winding under the influence of both said primary and tertiary windings to the leakage flux of said secondary winding under the influence of said primary winding alone is less than 90%.

13. A fly-back transformer as claimed in claim 1, wherein said tertiary winding is mounted on said first coil bobbin, at one end of said primary winding.

14. A fly-back transformer as claimed in claim 1, wherein said tertiary winding is mounted on said first coil bobbin, at the center of said primary winding.

15. A fly-back transformer as claimed in claim 1, wherein said tertiary winding is mounted on said second coil bobbin, at one end of said secondary winding.

16. A fly-back transformer as claimed in claim 1, wherein said commutating circuit comprises a diode and a capacitance means.

17. A fly-back transformer for use in a horizontal deflection circuit of a television receiver, the operation of said circuit being cyclical, each cycle of said circuit being divided into a scanning period and a retrace period, said transformer comprising:

a core member;

a first [core] *coil* bobbin located on said core member;

a primary winding for low voltage supply located on said first coil bobbin;

a second coil bobbin located on said first coil bobbin;

a secondary winding producing a high voltage output responsive to an electromagnetic field generated by said core and located on said second coil bobbin;

a tertiary winding producing an output responsive to an electromagnetic field generated by said core, and having a first and a second portion, said first portion *of said tertiary winding* being located in a position such that the magnetic coupling of said first portion with said primary winding is [loose,] *strong, and said second portion of said tertiary winding being located in a position such that the magnetic coupling of said second portion with said primary winding is weak relative to the coupling between said first portion and said primary winding, and said second portion of* said tertiary winding [interlinking] *interlinks* with leakage flux of said secondary winding with respect to said primary winding; and commutating circuit means connected to said tertiary winding being operated so as to commutate the output of said tertiary winding only during said scanning period of said deflection circuit.

18. A fly-back transformer as claimed in claim 17, wherein said second portion of said tertiary winding is located over an insulating material located over said primary winding and said first portion is located directly on said primary winding.

19. A fly-back transformer as claimed in claim 17, wherein said second portion of said tertiary winding is located at one end of said primary winding and said first portion is located directly on said primary winding.

20. A fly-back transformer as claimed in claim 17, wherein said second portion of said tertiary winding is located at one end of said secondary winding and said first portion is located directly on said primary winding.

21. A fly-back transformer for use in a horizontal deflection circuit of a television receiver, the operation of said circuit being cyclical, and each cycle of said circuit being divided into a scanning period and a retrace period, said transformer comprising:

a core member;

a first coil bobbin located on said core member;

a primary winding for supplying low voltage located on said first coil bobbin;

a second coil bobbin located on said first coil bobbin;

a secondary winding for supplying high voltage output responsive to an electromagnetic field generated by said core, located on said second coil bobbin;

a tertiary winding supplying an output responsive to an electromagnetic field generated by said core, and having first and second portions, said first portion being located at one end and said second portion being located at the other end of said primary winding, whereby the magnetic coupling of said tertiary winding with said primary winding is loose and said tertiary winding interlinks with leakage flux of said secondary winding with respect to said primary winding; and commutating circuit means connected to said tertiary winding so as to commutate the output of said tertiary winding only during said scanning period of said deflection circuit.

22. A fly-back transformer for use in a horizontal deflection circuit of a television receiver, the operation of said circuit being cyclical, and each cycle of said circuit being divided into a scanning period and a retrace period, said transformer comprising:

a core member;

a first coil bobbin located on said core member;

a primary winding for supplying low voltage located on said first coil bobbin;

a second coil bobbin located on said first coil bobbin;

a secondary winding for supplying a high voltage output responsive to an electromagnetic field generated by said core, located on said second coil bobbin;

a tertiary winding for supplying an output responsive to an electromagnetic field generated by said core, and having first and second portions, said first portion being located at one end of said secondary winding and said second portion being located at the other end thereof, whereby the magnetic coupling of said tertiary winding with said primary winding is loose and said tertiary winding interlinks with lenkage flux of said secondary winding with respect to said primary winding; and commutating circuit means connected to said tertiary winding for commutating the output of said tertiary winding only during said scanning period of said deflection circuit.

23. A fly-back transformer for use in a horizontal deflection circuit of a television receiver, the operation of said circuit being cyclical, and each cycle of said circuit being divided into a scanning period and a retrace period, said transformer comprising:

a core member;

a first coil bobbin located on said core member;

a primary winding for supplying a low voltage located on said first coil bobbin;

a second coil bobbin located on said first coil bobbin;

a secondary winding for supplying a high voltage output responsive to an electromagnetic field generated by said core, located on said second coil bobbin, said secondary winding being divided into a plurality of portions alternately connected in series to a plurality of diodes;

a tertiary winding for supplying an output responsive to an electromagnetic field generated by said core, so located that the magnetic coupling of said tertiary winding with respect to said primary winding is loose and said tertiary winding interlinks with leakage flux of said secondary winding with respect to said primary winding; and commutating circuit means connected to said tertiary winding so as to commutate the output of said tertiary winding only during said scanning period of said deflection circuit.

* * * * *